US011670023B2

(12) United States Patent
Xu et al.

(10) Patent No.: US 11,670,023 B2
(45) Date of Patent: Jun. 6, 2023

(54) ARTIFICIAL INTELLIGENCE TECHNIQUES FOR PERFORMING IMAGE EDITING OPERATIONS INFERRED FROM NATURAL LANGUAGE REQUESTS

(71) Applicant: Adobe Inc., San Jose, CA (US)

(72) Inventors: Ning Xu, Milpitas, CA (US); Trung Bui, San Jose, CA (US); Jing Shi, Rochester, NY (US); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 285 days.

(21) Appl. No.: 17/007,693

(22) Filed: Aug. 31, 2020

(65) Prior Publication Data

US 2022/0067992 A1 Mar. 3, 2022

(51) Int. Cl.
*G06T 7/00* (2017.01)
*G06T 19/20* (2011.01)
*G06T 11/60* (2006.01)
*G10L 15/16* (2006.01)
*G10L 15/22* (2006.01)

(52) U.S. Cl.
CPC .............. *G06T 11/60* (2013.01); *G10L 15/16* (2013.01); *G10L 15/22* (2013.01); *G10L 2015/223* (2013.01)

(58) Field of Classification Search
USPC ................ 382/153–160, 170–224, 254–311; 704/1–275
See application file for complete search history.

(56) References Cited

U.S. PATENT DOCUMENTS

| 8,035,747 | B2* | 10/2011 | Fredlund ................ H04N 5/907 348/576 |
| 10,635,713 | B2* | 4/2020 | Feng ....................... G06F 16/583 |
| 2009/0208118 | A1* | 8/2009 | Csurka .................... G06T 11/60 382/228 |
| 2017/0263248 | A1* | 9/2017 | Gruber .................... G10L 15/02 |
| 2019/0196698 | A1* | 6/2019 | Cohen ................... G06F 3/04845 |

OTHER PUBLICATIONS

Anderson et al., Bottom-Up and Top-Down Attention for Image Captioning and Visual Question Answering, 2018 IEEE/CVF Conference on Computer Vision and Pattern Recognition, Jun. 18-23, 2018, pp. 6077-6086.

(Continued)

*Primary Examiner* — Marcellus J Augustin
(74) *Attorney, Agent, or Firm* — Kilpatrick Townsend & Stockton LLP

(57) ABSTRACT

This disclosure involves executing artificial intelligence models that infer image editing operations from natural language requests spoken by a user. Further, this disclosure performs the inferred image editing operations using inferred parameters for the image editing operations. Systems and methods may be provided that infer one or more image editing operations from a natural language request associated with a source image, locate areas of the source that are relevant to the one or more image editing operations to generate image masks, and performing the one or more image editing operations to generate a modified source image.

19 Claims, 9 Drawing Sheets

(56) References Cited

OTHER PUBLICATIONS

Antol et al., VQA: Visual Question Answering, Proceedings of the IEEE International Conference on Computer Vision, 2015, pp. 2425-2433.

Chen et al., Language-Based Image Editing with Recurrent Attentive Models, In Proceedings of the IEEE Conference on Computer Vision and Pattern Recognition, Jun. 10, 2018, 9 pages.

Cheng et al., Sequential Attention GAN for Interactive Image Editing Via Dialogue, MM '20: Proceedings of the 28th ACM International Conference on Multimedia, Oct. 12-16, 2020, pp. 4383-4391.

El-Nouby et al., Tell, Draw, and Repeat: Generating and Modifying Images Based on Continual Linguistic Instruction, In Proceedings of the IEEE International Conference on Computer Vision, Sep. 23, 2019, pp. 10304-10312.

Gonzalez et al., Digital Image Processing, Pearson International Edition, 2002, pp. 10976.

He et al., Deep Residual Learning for Image Recognition, Proceedings of the IEEE Conference on Computer vision and Pattern Recognition, Jun. 27-30, 2016, pp. 770-778.

Hu et al., Exposure: A White-Box Photo Post-Processing Framework, CM Transactions on Graphics (TOG), vol. 37, No. 2, 2018, 23 pages.

Hu et al., Natural Language Object Retrieval, In Proceedings of the IEEE Conference on Computer Vision and Pattern Recognition, Apr. 11, 2016, 14 pages.

Kazemzadeh et al., ReferitGame: Referring to Objects in Photographs of Natural Scenes, Proceedings of the 2014 Conference on Empirical Methods in Natural Language Processing (EMNLP), Oct. 25-29, 2014, pp. 787-798.

Kirillov et al., Panoptic Segmentation, In Proceedings of the IEEE Conference on Computer Vision and Pattern Recognition, 2019, pp. 9404-9413.

Laput et al., Pixeltone: A Multimodal Interface for Image Editing, In Proceedings of the SIGCHI Conference on Human Factors in Computing Systems, Apr. 27-May 2, 2013, 10 pages.

Liu et al., Improving Referring Expression Grounding with Cross-Modal Attention-Guided Erasing, In Proceedings of the IEEE Conference on Computer Vision and Pattern Recognition, 2019, pp. 1950-1959.

Nam et al., Text-Adaptive Generative Adversarial Networks: Manipulating Images with Natural Language, NIPS'18: Proceedings of the 32nd International Conference on Neural Information Processing Systems, 2018, 10 pages.

Nazeri et al., EdgeConnect: Generative Image Inpainting with Adversarial Edge Learning, Conference: ICCV Workshops, 2019, 10 pages.

Park et al., Distort-And-Recover: Color Enhancement Using Deep Reinforcement Learning, In Proceedings of the IEEE Conference on Computer Vision and Pattern Recognition, 2018, pp. 5928-5936.

Pennington et al., GloVe: Global Vectors for Word Representation, Proceedings of the 2014 Conference on Empirical Methods in Natural Language Processing (EMNLP), Oct. 25-29, 2014, pp. 1532-1543.

Reed et al., Generative Adversarial Text to Image Synthesis, Available Online at: URL: http://proceedings.mlr.press/v48/reed16.html, Jun. 5, 2016, 10 pages.

Riba et al., Kornia: An Open Source Differentiable Computer Vision Library for PyTorch, Project: Kornia, Oct. 9, 2019, 11 pages.

Shinagawa et al., Interactive Image Manipulation with Natural Language Instruction Commands, Dialogue-Based Image Editing, Feb. 23, 2018, 11 pages.

Wang et al., Learning to Globally Edit Images with Textual Description, Available Online at https://arxiv.org/pdf/1810.05786.pdf, Oct. 13, 2018, 21 pages.

Wang et al., Look Before You Leap: Bridging Model-Free and Model-Based Reinforcement Learning for Planned-Ahead Vision-and-Language Navigation, In Proceedings of the European Conference on Computer Vision (ECCV), Jul. 26, 2018, 21 pages.

Wang et al., Reinforced Cross-Modal Matching and Self-Supervised Imitation Learning for Vision-Language Navigation, In Proceedings of the IEEE Conference on Computer Vision and Pattern Recognition, 2019, pp. 6629-6638.

Xiong et al., UPSNet: A Unified Panoptic Segmentation Network, In Proceedings of the IEEE Conference on Computer Vision and Pattern Recognition, Apr. 3, 2019, 15 pages.

Xu et al., AttnGAN: Fine—Grained Text to Image Generation with Attentional Generative Adversarial Networks, In Proceedings of the IEEE Conference on Computer Vision and Pattern Recognition, 2018, pp. 1316-1324.

Yang et al., A Fast and Accurate One-Stage Approach to Visual Grounding, In Proceedings of the IEEE International Conference on Computer Vision, 2019, pp. 4683-4693.

Yu et al., Mattnet: Modular Attention Network for Referring Expression Comprehension, Proceedings of the IEEE Conference on Computer Vision and Pattern Recognition, Jun. 2018, 9 pages.

Zhang et al., StackGAN: Text to Photo-Realistic Image Synthesis with Stacked Generative Adversarial Networks, In Proceedings of the IEEE International Conference on Computer Vision, Dec. 10, 2016, 15 pages.

* cited by examiner

ARTIFICIAL INTELLIGENCE TECHNIQUES FOR PERFORMING IMAGE EDITING OPERATIONS INFERRED FROM NATURAL LANGUAGE REQUESTS

TECHNICAL FIELD

The present disclosure generally relates to enhanced image processing. More specifically, but not by way of limitation, the present disclosure relates to executing artificial intelligence models that infer local or global image editing operations from a natural language request, infer the parameters for the image editing operations, and perform the image editing operations on a source image (e.g., any graphical content depicting any likeness of a person or object, including a photo, a hand drawing, a computer-generated graphic, a video frame, and so on).

BACKGROUND

Image editing tools are widely used today. Image editing tools enable users to edit photos, for example, to remove tourists from wedding photos, enhance the saturation and contrast of images, or replace the background of images. Manually editing images using image editing tools, however, is not a simple task. To perform image editing operations, users may need to understand certain aspects of images, such as color, hue, saturation, selection, lightness, chroma, and so on. Manipulating the various different aspects of images to edit an image can also be a complicated, effort-intensive, and time-consuming endeavor.

Recently, certain tools have been built that use natural language processing to assist users in performing complex tasks, such as visual question answering and visual-and-language navigation. These tools, however, often provide limited functionality to assist users, given the complexity involved in natural language processing. Additionally, these tools are burdensome, given the need for the user to define parameters for the editing tasks. Therefore, a wide swath of functionality that users may need to perform, such as automatically performing localized image editing, cannot be performed using these tools.

SUMMARY

Certain aspects and features of the present disclosure relate to executing artificial intelligence models to infer local or global image editing operations from a natural language request, infer the parameters for the inferred image editing operations, and perform the inferred image editing operations with the inferred parameters on a source image. For instance, an image editing tool uses these artificial intelligence models to enable users to perform image editing operations on a source image via natural language verbal commands that identify the intended image editing tasks.

In one example, these artificial intelligence models include an operation classifier, a grounding model, and an operation modular network that, in combination, infer local image editing operations (e.g., edits performed on a subset of the set of pixels of a source image) or global image editing operations (e.g., edits performed on the entire set of pixels of the source image) from a natural language request. In this example, the operation classifier is a multi-label classifier model configured to infer a set of one or more image editing operations from the words included in a natural language request. The inferred image editing operation set is inputted into the grounding model, which has been configured to locate one or more target areas of the source image that are inferred to be most relevant to the inferred image editing operation. The grounding model generates a set of one or more image masks for the inferred image editing operation. The source image, the image mask set, and the natural language request may be inputted into an operation modular network, which includes submodules for different image editing operations. Each submodule of the operation modular network is configured to infer parameters for a respective image editing operation and to perform that image editing operation on the source image using the inferred parameters. If, for instance, the natural language request includes the expression "Please make the image brighter," the submodule infers a suitable value for increasing the brightness of the source image. The output image is a modified version of the source image after applying the inferred editing operations.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
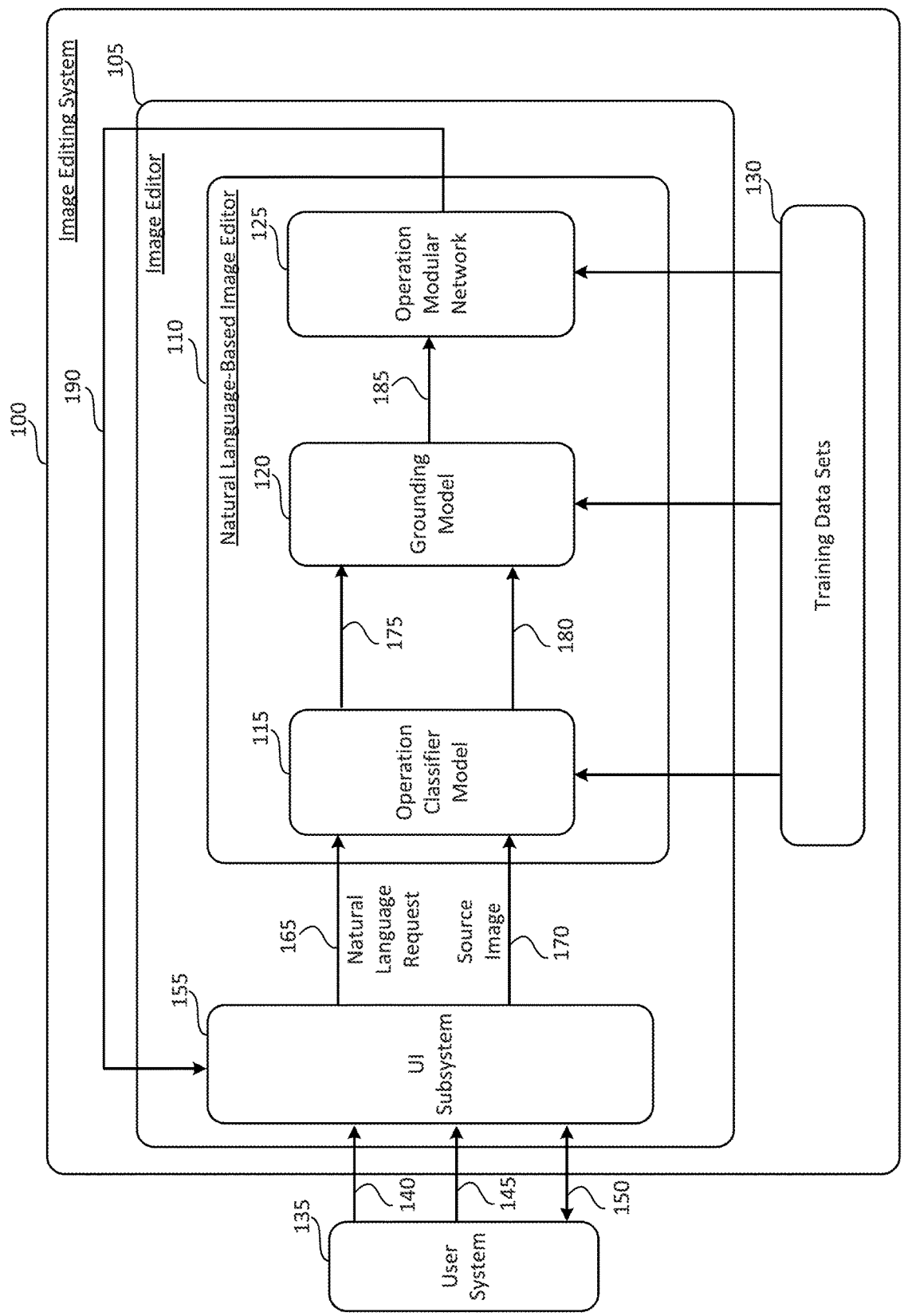
FIG. 1 depicts an example of a computing environment for performing image editing operations in response to natural language requests using a natural language-based image editor, according to some aspects of the present disclosure.

Certain aspects of the present disclosure relate to using artificial intelligence techniques to automatically infer local or global image editing operations and their corresponding parameters from natural language requests. The artificial intelligence techniques described herein is be used by an image editor application to enable a user to perform image editing operations on a source image (e.g., any type of image captured by any type of camera or image sensor) by speaking a natural language request (e.g., a natural language expression that indicates the user's editing request, spoken or typed by the user). The natural language request mentions a request to modify the source image in one or more ways, such as "remove an object from the picture," "make the image sharper," or "remove the man in the red shirt holding the controller and brighten the image." An image editing operation is a task that, when performed by an image editor application, modifies an attribute of the source image (e.g., increases a brightness of the original source image or removes an object from the source image). Further, certain image editing operations are performable only after one or more parameters are defined. For example, a parameter is a magnitude of a particular modification, such as a magnitude for increasing or decreasing a brightness (e.g., as indicated by a brightness value). The image editor application outputs a modified source image, which is modified according to one or more image editing operations inferred from the natural language request spoken by the user.

In some implementations, the natural language-based image editor is executed using a computing environment, which includes an operation classifier model, a grounding model, and an operation modular network. The source image and the natural language request are inputted into the operation classifier, which is trained to output one or more image editing operations inferred to have been mentioned in the natural language request. As a non-limiting example, the operation modular network is a multi-label classification network trained to predict image editing operations referred to in a natural language request. The multi-label classification network is trained using supervised learning techniques, although the present disclosure is not limited to supervised learning.

In some implementations, the grounding model includes an attention layer and a language attention network that operate together to output an image mask for each inferred image editing operation. For example, the attention layer includes a classifier model trained to classify whether the inferred image editing operation is a local image editing operation or a global editing operation, given the context of the source image and the natural language request. When the attention layer generates an output classifying the inferred image editing operation as a local image editing operation, the language attention network infers a target area (e.g., a subset of pixels of the set of pixels) of the source image for applying the local image editing operation. The language attention network also generates an image mask for the target area of the source image.

In some implementations, the operation modular network includes a plurality of submodules for performing the image editing operations. Each submodule is configured to perform an inferred image editing operation. Further, a submodule is configured for each potential image editing operation of the various image editing operations that is inferred from a natural language request. For example, each submodule receives, as input, the source image, the natural language request, and the inferred image mask for the inferred image editing operation. The submodule uses a differentiable filter to generate an output image, on which the inferred image editing operation is performed on the inferred target area associated with the image mask.

Certain aspects and features of the present disclosure relate to training artificial intelligence models for performing image editing using a natural language-based image editor. Training the artificial intelligence models includes collecting a set of images from various data sources. For example, a data source stores images posted by photographers who edited images in response to image editing requests. Further, a list of image editing operations that were performed by the photographers on the set of images is also collected. Annotators annotate images to indicate whether a local image editing operation can be grounded (e.g., associated with a target object or region of the source image). In some implementations, panoptic segmentation models are used to enable the annotators to determine whether edited areas of images belong to any presegmented regions. After the annotation, annotators are further asked to annotate certain qualified samples of images with all possible operations from the list of operations as the edited region of each operator. Additional rounds of annotation are performed by other annotators or experts. A diverse set of previously performed natural language requests are collected to improve the ability of the artificial intelligence models to generalize on new, unseen data.

Certain embodiments provide improvements over existing software tools that use natural language processing to edit imagery. For instance, automatically locating an object or region within a source image that is inferred to be relevant to an image editing operation, which is described in a natural language request, involves applying particular rules, such as artificial intelligence algorithms, to achieve an improved technological result, including performing an image editing operation with inferred parameters (e.g., performing a brightness image editing operation with a brightness value inferred from the context of a source image and a natural language request). Thus, embodiments described herein improve computer-implemented processes for editing images, thereby providing a more suitable solution for automating tasks previously performed by humans.

A natural language-based image editor generates an output that is evaluated to infer or predict the image editing operation or parameters described in the natural language request. For example, the natural language-based image editor infers or predicts an image editing operation from a natural language request by generalizing the previously-edited images of the training data set in response to the new, previously unseen (to the natural language-based image editor) natural language request. Additionally, the natural language-based image editor may ground an image editing operation to an object or region of the source image by locating an object or region of an image that is most relevant to a natural language request. For example, a natural language request includes "remove the man in the red shirt from the picture." The natural language-based image editor infers that the natural language request refers to the inpaint_obj operation and automatically grounds the inpaint_obj operation by locating the pixels depicting the man in the red shirt.

FIG. 1 depicts an example of a computing environment for performing image editing operations in response to natural language requests using a natural language-based image editor, according to some aspects of the present disclosure. For example, FIG. 1 illustrates an image editing system 100. In certain embodiments, the image editing system 100 provides an image editor 105 that incorporates a natural language-based image editor 110 for providing image editing functionality based on natural language requests spoken or typed by a user. The user operates user system 135 to access the image editing system 100. The image editing functionality includes image processing or image editing.

Figure 7:
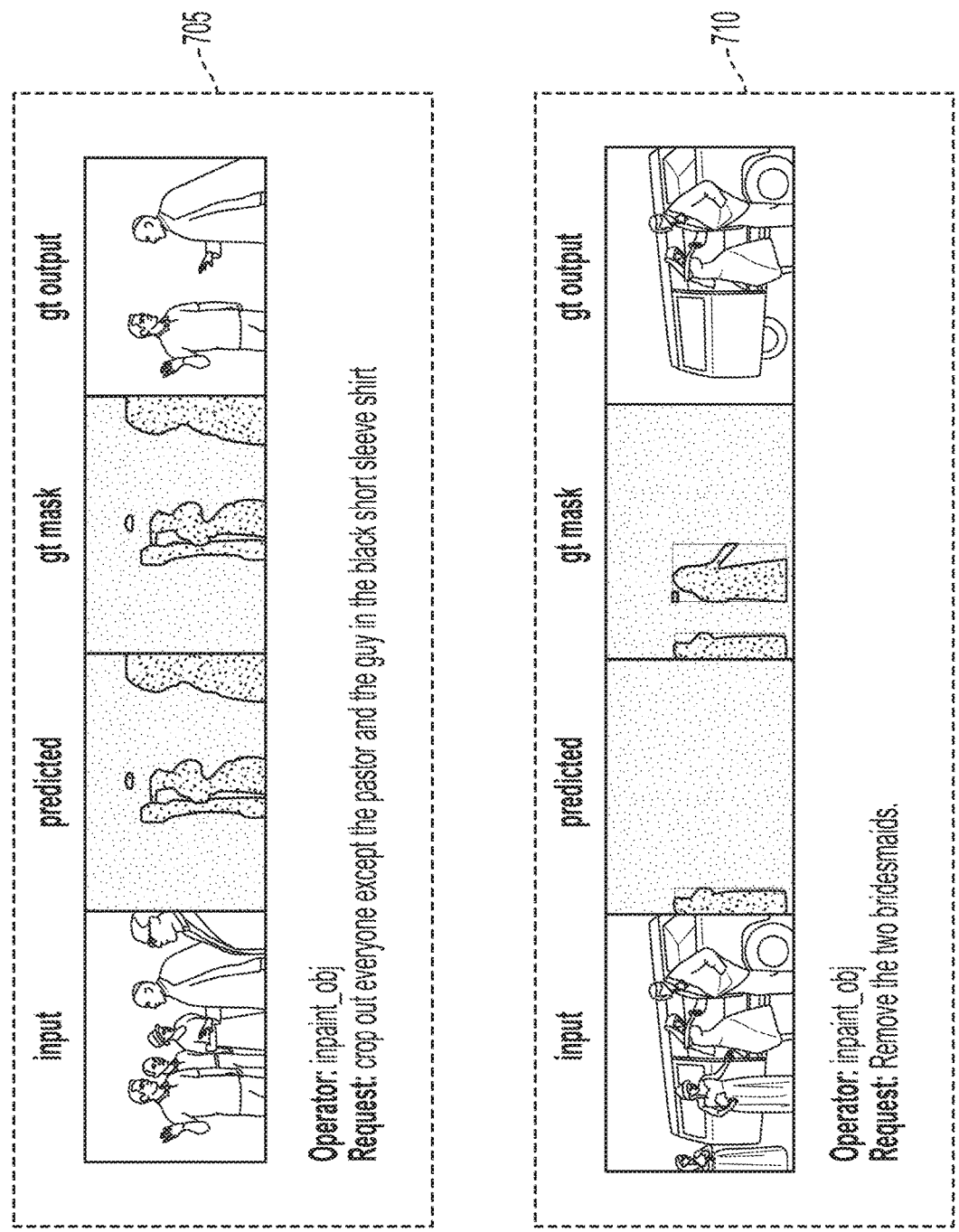
FIG. 7 depicts an example of various stages of image editing using a natural language-based image editor, according to some aspects of the present disclosure.
Figure 8:
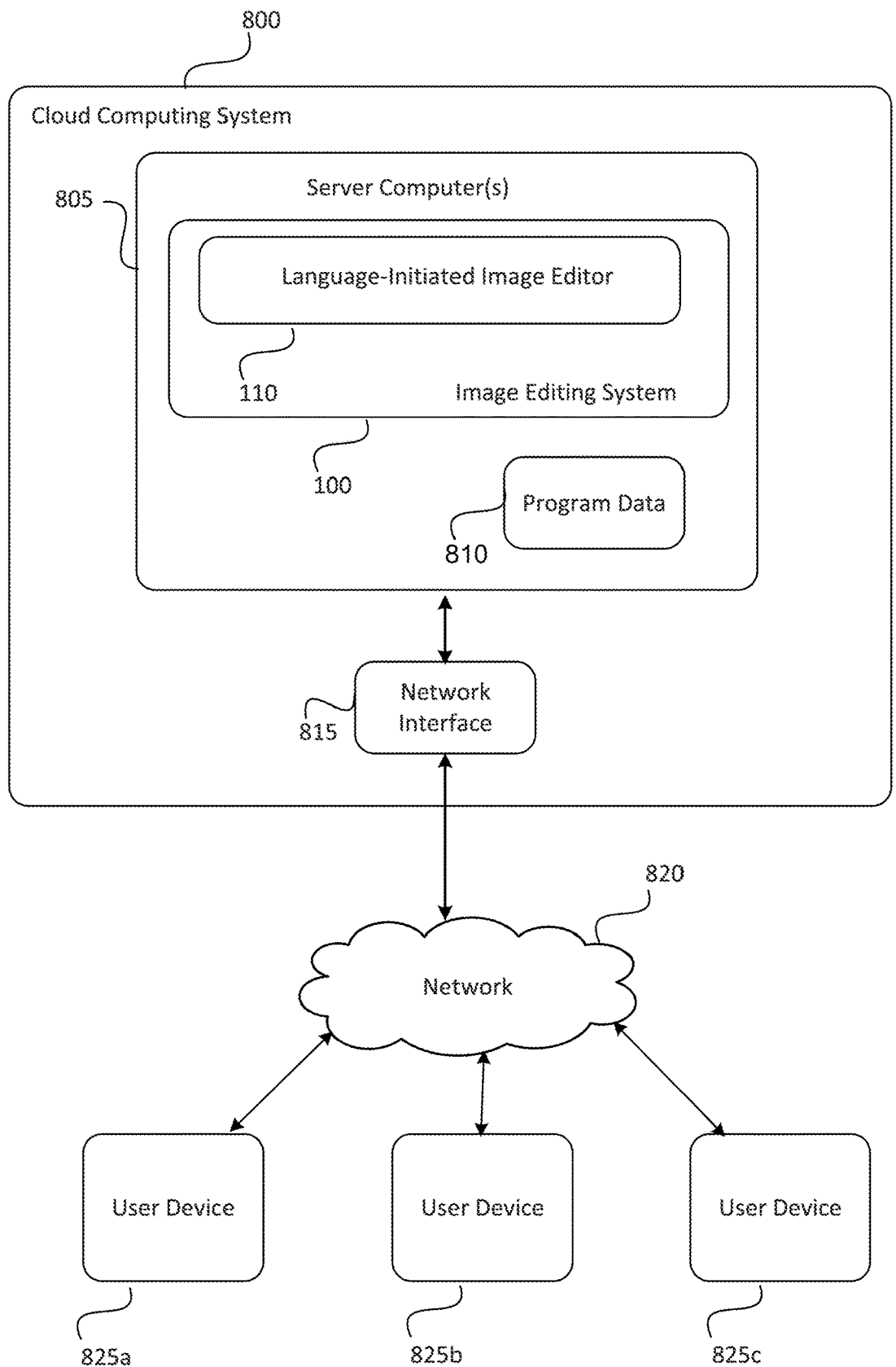
FIG. 8 depicts an example of a cloud computing system for implementing certain embodiments described herein.
Figure 9:
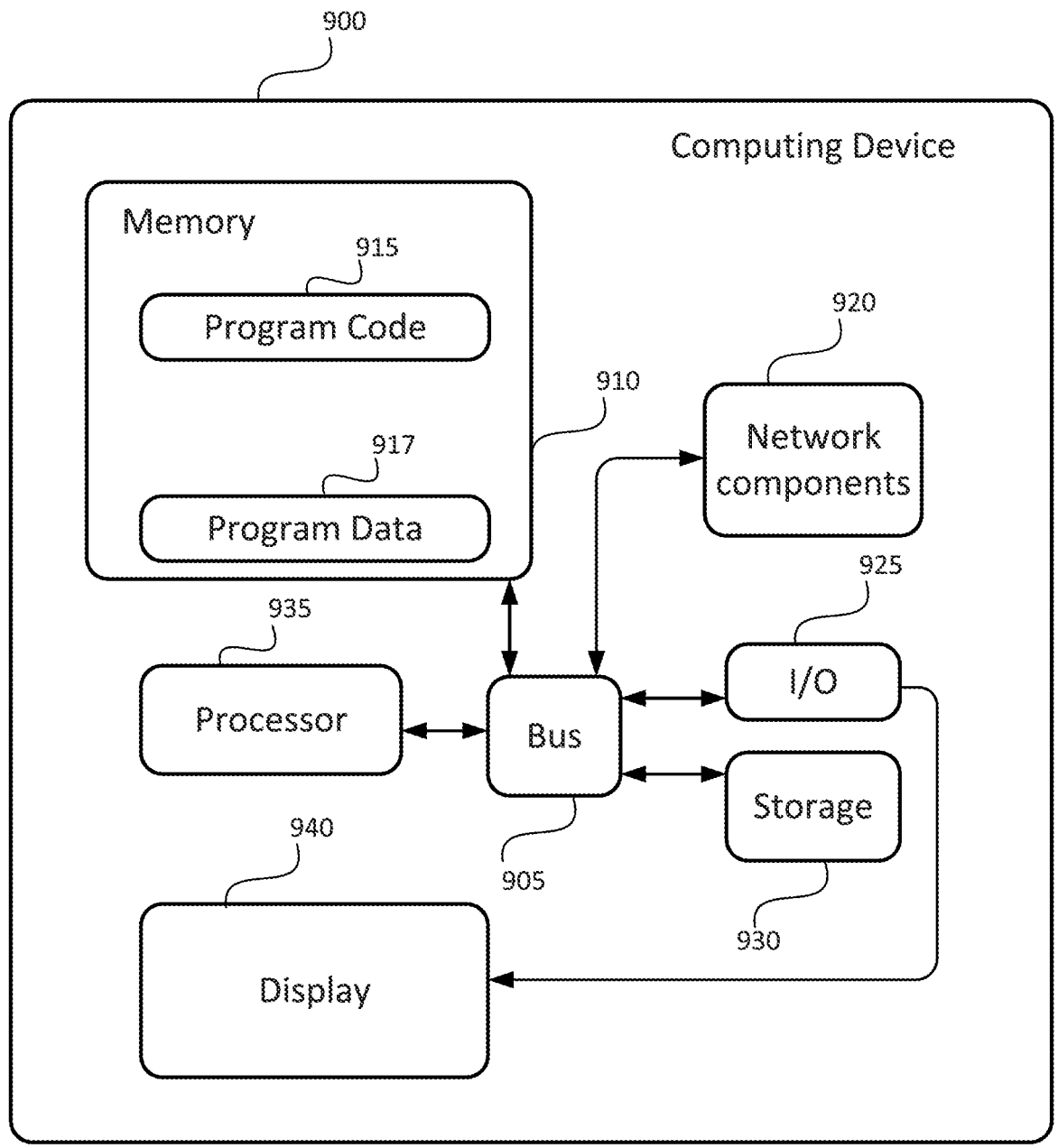
FIG. 9 depicts an example of a computing system for implementing certain embodiments described herein.

User system 135 is any suitable computer system including, for example, any of user devices 825a-c of FIG. 8 and/or computing device 900 of FIG. 9. A user may utilize user system 135 to access the image editing system 100 via user interface (UI) subsystem 155. Image editing system 100 includes any suitable computer system including, for example, server computer 805 of FIG. 8 and/or computing device 900 of FIG. 9. In certain embodiments, image editing system 100 provides users with image editing functionality, including a natural language-based image editor 110. Image editing functionality includes the ability to edit images, for example, regarding the size, shape, presence of an object, color, or any other attribute of an image or portion of an image. For example, as used throughout, the natural language-based image editor 110 is configured to enable a user to automatically perform image editing functionality by speaking or typing a natural language request. Examples of such original and modified source images are described in more detail with respect to FIGS. 5 and 7. Non-limiting examples of color parameters of the image includes the hue, luminance, saturation, gain, and any suitable color parameters used for image editing. In some implementations, the color parameters include three sets of color parameter values; one set of color parameter values for each of the various tones including highlight, midtone, and shadow (e.g., midtone hue or shadow saturation). The values of the color parameters of an image represent a color grading.

As an illustrative example, a source image depicts a group of individuals, one of which is a man in a red shirt on the right side of the image and holding a remote control. A user wants to remove the man in the red shirt from the source image and increase the sharpness of the source image. The user system 135 runs the natural language-based image editor 110 and receives the source image for editing. The user system 135 also receives the following natural language request: "Please remove the man in the red shirt on the right holding the remote control and make the image clearer." The natural language request is captured by a microphone of the user system 135. The natural language request in turn is pre-processed (e.g., certain words are removed, such as "a" and "the") and transmitted to the natural language-based image editor 110. The source image and the natural language request are received at the natural language-based image editor 110. The operation classifier model 115 processes the natural language request to infer which image editing operations are described in the natural language request. The operation classifier model 115 classifies the natural language request as referring to an "inpaint_obj" image editing operation that removes an object from the source image, and a "sharpness" image editing operation, which increases the sharpness attribute of the source image. The natural language request and the two image editing operations are transmitted to the grounding model 120. The grounding model 120 infers whether each image editing operation is a local image editing operation or a global image editing operation. The grounding model 120 infers that the "inpaint_obj" operation is a local image editing operation and the "sharpness" image editing operation is a global image editing operation. Further, the grounding model 120 locates an object or region of the source image that is most relevant to each of the "inpaint_obj" image editing operation and the "sharpness" image editing operation. The grounding model also uses visual modules to infer that the portion of the source image that depicts a man wearing a red shirt is most relevant to the "inpaint_obj" operation. Additionally, the visual models infer that the entire source image is most relevant to the "sharpness" operation. The grounding model 120 generates an image mask for each of the two image editing operations. The generated image masks, the source image, and the natural language request are transmitted to the operation modular network 125 to perform each of the two operations. The operation modular network 125 includes a submodule for the "inpaint_obj" operation and a separate submodule for the "sharpness" operation. Each submodule is trained to perform its corresponding image editing operation by inferring parameters for the associated image editing operation. Each operation is performed sequentially (or potentially in parallel). The "inpaint_obj" is performed first, and then the "sharpness" operation is performed next. The submodule for the "sharpness" operation is configured to automatically infer the parameter for the operation (e.g., the value or magnitude of sharpness). The natural language-based image editor 110 then outputs a modified image to the user for display on the user system 135.

Image editor 105 may be implemented using software, hardware, firmware, or any combination thereof. In some implementations, the image editor 105 includes UI (User Interface) subsystem 155 that communicates with a user system 135 operated by a user. The image editor 105 also includes a natural language-based image editor 110 for performing some or all of the image editor 105 functionality (e.g., the performance of image editing operations based on natural language requests, as described herein).

In some implementations, the natural language-based image editor 110 includes an operation classifier model 115, a grounding model 120, and an operation modular network 125. The operation classifier model 115 is a model trained using at least a portion of the training data set 130 and one or more machine-learning or artificial-intelligence techniques. For example, the operation classifier model 115 includes a neural network trained using supervised learning techniques to infer one or more image editing operations in response to receiving a natural language request as an input. The source image and the natural language request are inputted into the operation classifier model 115, which is trained to output one or more image editing operations inferred to have been mentioned in the natural language request. As a non-limiting example, the operation classifier model 115 is a multi-label classification network trained to predict image editing operations referred to in a natural language request. The multi-label classification network is trained using supervised learning techniques. A training sample of the training data set 130 includes an edited image annotated with the ground truth of the one or more image editing operations performed on the edited image. The operation classifier model 115 includes a multi-label classification network trained to infer the existence of an image editing operation from a natural language request. The operation classifier model 115 is further described with respect to FIG. 2. While only three components are depicted in the natural language-based image editor 110 of FIG. 1 (e.g., the operation classifier model 115, the grounding model 120, and the operation modular network 125), the natural language-based image editor 110 includes any number of components or neural network layers.

The grounding model 120 is trained using at least a portion of the training data set 130 to generate an image mask for each image editing operation inferred from the natural language request. In some implementations, the grounding model 120 includes an attention layer and a language attention network that operate together to output an image mask for each inferred image editing operation. For example, the attention layer includes a classifier model trained to classify whether the inferred image editing operation is a local image editing operation or a global image editing operation, given the context of the source image and the natural language request. When the attention layer generates an output classifying that the inferred image editing operation is a local image editing operation, the language attention network infers a target area (e.g., a subset of pixels of the set of pixels) of the source image for applying the local image editing operation. When the attention layer generates an output classifying the image editing operation as a global image editing operation, the grounding model 120 generates a global image mask that covers the entire source image (e.g., the full set of pixels of the source image). Further, in some examples, the language attention network may not be needed or may be bypassed when the image editing operation is a global image editing operation because the entire source image is one mask.

In some implementations, the language attention network includes a plurality of visual modules that automatically detect word embeddings of the natural language request that are relevant to certain aspects of the source image. As a non-limiting example, the visual modules include a subject module, a location module, and a relationship module. The subject module includes an attention model configured to infer which one or more words of the natural language request are relevant to an object representing an individual or subject (e.g., "the man wearing a red shirt"). The subject module then infers which subset of pixels depicts the one or more words relating to the object. The location module also includes an attention model to infer which one or more words of the natural language request are relevant to a location of the object (e.g., "the man on the right"). The location module then uses the one or more words that are relevant to the location of the object to locate the subject of the source image. The relationship module infers which object of the source image is the target of the inferred image editing operation based on the one or more words of the natural language request that describe a relationship with another object (e.g., "the man holding a remote control" or "the girl on the chair"). The language attention network then conditions (e.g., modifies) the output of each one of the visual modules based on an operation attention weight, described in greater detail herein, to locate the object in the source image that is most relevant to the inferred image editing operation.

In some implementations, the operation modular network 125 is configured to individually perform each image editing operation inferred from the natural language request by the operation classifier model 115. The operation modular network 125 includes a plurality of submodules for performing the image editing operation. Each submodule is configured to perform an inferred image editing operation. One submodule is configured for each potential image editing operation of the various image editing operations that can be inferred from a natural language request. For example, each submodule receives as input the source image, the natural language request, and the inferred image mask for the inferred image editing operation. The submodule generates an output image, on which the inferred image editing operation is performed on the inferred target area associated with the image mask.

Accordingly, in use, beginning with user system 135, the user provides a source image indicated by arrow 140 and a natural language request as indicated by arrow 145 using a user interface that is displayed or provided on user system 135 and a microphone provided on user system 135. Other communications may be transmitted or received indicated by arrow 150. The UI subsystem 155 receives the source image and the natural language request and provides the source image (as shown by arrow 165) and the natural language request (as shown by arrow 170) as an input to the natural language-based image editor 110.

Once the natural language-based image editor 110 receives the source image and the natural language request, the natural language-based image editor 110 processes the source image and the natural language request according to certain implementations. The source image and the natural language request is passed through the operation classifier model 115, which infers one or more image editing operations from the natural language request. The inferred image editing operation is passed to the grounding model (as shown by arrow 175). The source image and/or the natural language request are also passed to the grounding model 120 (as shown by arrow 180). The grounding model 120 infers whether the image editing operation is applied locally (e.g., to a subset of the set of pixels of the source image) or globally (e.g., to the entire set of pixels of the source image). When applied locally, the grounding model 120 generates an image mask for the local operation. When applied globally, the entire source image is all one mask. An image mask is generated for each inferred image editing operation. The grounding model 120 transmits the generated image mask (along with the source image and the natural language request) to the operation modular network 125 (as shown by arrow 185). The operation modular network 125 then performs each inferred image editing operation on the source image in a sequential order to generate a modified source image. The modified source image is transmitted to the UI subsystem 155 for presentation on the user system 135 for viewing by the user (as shown by arrow 190). The UI subsystem then provides the output image received from the natural language-based image editor 110 to the user via the user interface on the user system 135. The user system 135 operates the image editor 105 to further modify and finalize the modified source image.

Training data set 130 is a data structure (e.g., a data storage device) that stores the training data set used to individually train the operation classifier model 115, the grounding model 120, and the operation modular network 125. Training the artificial intelligence models using at least a portion of the training data set 130 includes collecting and labeling a set of images from various data sources. For example, a data source stores images posted by photographers who edited images in response to image editing requests. Each edited image is be labeled with the one or more image editing operations performed on the source image. The labeled images are used as a training data set to train one or more artificial intelligence models used in the natural language-based image editor 110.

Figure 2:
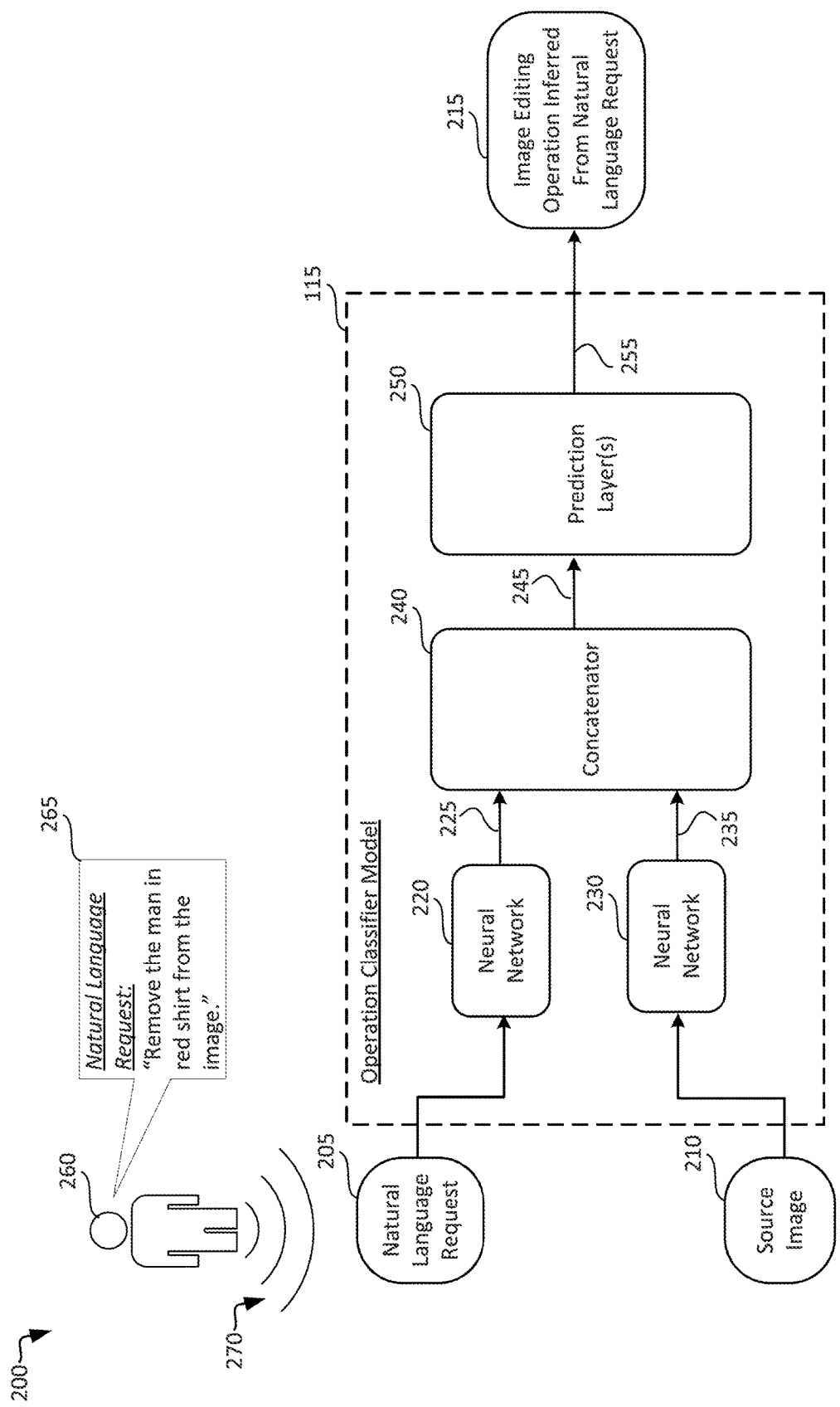
FIG. 2 depicts an example of using an operation classifier model for inferring image editing operations from a natural language request, according to some aspects of the present disclosure.

FIG. 2 depicts an example of a computing environment 200 for inferring image editing operations from a natural language request using an operation classifier model, according to some aspects of the present disclosure. The operation classifier model 115 in this example is configured to generate an inference 215 in response to receiving a natural language request 205 and a source image 210 as inputs. The inference 215 represents an inference of one or more image editing techniques that are described by the natural language request 205. The operation classifier model 115 includes at least two neural network layers 220 and 230, a feature concatenator 240, and one or more prediction layers 250. As illustrated in FIG. 2, the natural language request 265 of "Remove the man in the red shirt from the image" is spoken by user 260. The audible signals 270 of the spoken natural language request is captured by a microphone of a user device (e.g., user system 135) operated by user 260.

The natural language request 205 received at the operation classifier model 115 is inputted into a neural network 220, which outputs data signal 225 representing an encoded version (e.g., a reduced dimensionality version) of the natural language request 205. For example, the neural network 220 is a bi-directional LSTM (long short term memory), which outputs a feature vector representing the natural language request 205.

The source image 210 received at the operation classifier model 115 is inputted into neural network 230, which outputs a data signal 235 representing an encoded version of the source image 210. For example, the neural network 230 is a deep residual neural network trained for image recognition. The neural network 230 outputs a feature vector representing the source image 210.

Feature concatenator 240 concatenates the feature vector that was outputted by neural network 220 with the feature vector that was outputted by neural network 230. The concatenated feature vectors 245 is inputted into one or more fully-connected prediction layers 250 to generate the final output 255, which represents the image editing operation inferred from the natural language request 205. The final output 255 represents one or more image editing operations that are inferred to be described by the natural language request 205.

In some implementations, the prediction layer 250 includes one or more fully connected layers that are trained to generate the final output 255. As only a non-limiting example, the prediction layer 250 is trained using a multi-label cross-entropy loss technique. Any other text categorization or text classification techniques may be used to infer the image editing operations from the natural language request 205 and/or the source image 210. Additionally, while the operation classifier model 115 is described above as being trained using supervised learning techniques, the present disclosure is not limited thereto. In some implementations, the operation classifier model 115 is trained using unsupervised learning techniques for text analytics, such as, for example, clustering or latent semantic indexing (LSI).

Figure 3:
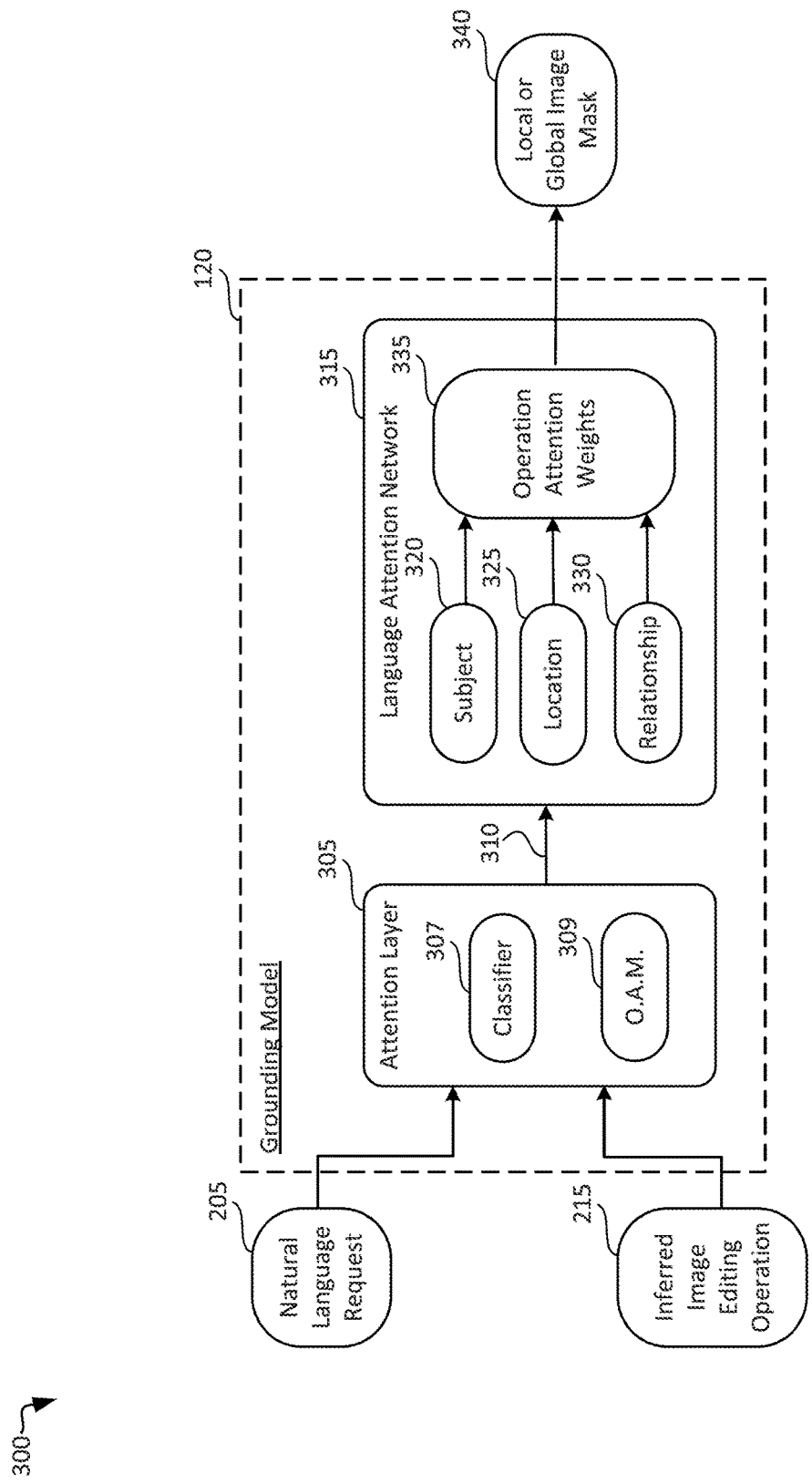
FIG. 3 depicts an example of using a grounding model for inferring a location of an image mask for an inferred image editing operation, according to some aspects of the present disclosure.

FIG. 3 depicts an example of a computing environment 300 for inferring a location of an image mask associated with an image editing operation inferred from a natural language request. The grounding model 120 in this example is configured to generate a local or global image mask 340 in response to receiving the natural language request 205 and the image editing operation inferred by the operation classifier model 115 (e.g., inferred image editing operation 215). As illustrated in FIG. 3, the grounding model 120 is configured to include an attention layer 305 and a language attention network 315.

In some implementations, the grounding model 120 is trained to ground an inferred image editing operation to a target area of the source image. "Grounding" in this context refers to locating the most relevant object or region (e.g., the target area) of a source image based on a natural language request. For example, an "inpaint_obj" image editing operation is grounded to a man in a red shirt depicted in the source image when the natural language request includes the phrase "remove the man in the red shirt." In some implementations, the natural language request 205 is composed of multiple inferred image editing operations (e.g., "remove the man in the red shirt and make the image brighter"). The attention layer 305 selects an inferred image editing operation from the multiple inferred image editing operations, and then the selected image editing operation is inputted into language attention network 315, which is trained to perform the grounding for the selected image editing operation.

In some implementations, the attention layer 305 includes a classifier model 307 and an operation attention model 309 (illustrated as OAM in FIG. 3). The attention layer 305 is trained to classify whether the inferred image editing operation is a local image editing operation or a global editing operation, given the context of the source image and the natural language request 205. The natural language request 205 includes multiple image editing operations. Thus, the attention layer 305 selects an inferred image editing operation from the multiple inferred image editing operations, and then infer a classification of the selected image editing operation as being a local image editing operation or a global image editing operation using the classifier model 307. The operation attention model 309 is trained to generate an operation attention weight for each word or phrase of the natural language request 205. The operation attention weight represents an inference of a relevance of the selected image editing operation to the inferred image editing operation. The operation attention model 309 also generates a feature vector that represents the source image using, for example, a residual neural network. The feature vector is concatenated with one or more word vectors representing the one or more words associated with the highest attention weight. Word vectors are generated for each word embedding in the natural language request 205 using any word-to-vector model, such as Word2Vec. For example, the operation attention weight indicates a relevance between a word or a phrase of the natural language request 205 and the selected image editing operation of the multiple image editing operations. The output of the concatenation is inputted into a trained neural network (e.g., feed forward artificial neural network) to output the classification of a local image editing operation or a global image editing operation.

As a non-limiting example, the operation attention model 309 generates the operation attention weight, $\alpha_t$, using the following equation:

$$\alpha_t = \frac{\exp(\langle o, h_t \rangle)}{\sum_{k=1}^{T} \exp(\langle o, h_k \rangle)} \qquad \text{(Equation 1)}$$

where $\langle \bullet, \bullet \rangle$ denotes an inner product, $h_t$ and $h_k$ are each a hidden vector of the associated word vector, and o is the operation word embedding.

When the attention layer 305 generates an output classifying the inferred image editing operation as a local image editing operation, the language attention network 310 is executed to ground the local image editing operation (e.g., the "inpaint_obj" operation) to the most relevant object or region within the source image. Grounding in this context refers to locating a target area (e.g., a subset of pixels of the set of pixels) of the source image to which the local image editing operation will be applied. The language attention network 315 also generates an image mask for the target area of the source image.

To achieve grounding of the local image editing operation to an object or region of the source image, the language attention network 315 executes a plurality of visual models. Each visual model includes an attention model that is trained to automatically detect word or phrase embeddings of the natural language request 205 that are relevant to a particular aspect of the source image. In some implementations, the language attention network 315 includes three visual modules, including a subject module 320, a location module 325, and a relationship module 330. The subject module uses an attention model to generate an attention weight for each word or phrase of the natural language request 205 to determine which word or phrase is most relevant to an object representing an individual or subject (e.g., "the man wearing a red shirt"). The subject module uses the attention weight to infer which object or region of the source image is described by the one or more words relating to the object (e.g., using a trained image classifier). The location module 325 also uses an attention model to generate an attention weight for each word or phrase of the natural language request 205 to determine which word or phrase is most relevant to a location of the object (e.g., "the man on the right"). The location module 325 uses the attention weight to generate a bounding box within the source image based on the inferred location of the object. The relationship module 330 uses an attention model to generate an attention weight for each word or phrase of the natural language request 205 to determine which word or phrase is most relevant to a relationship between the subject and another object (e.g., "the man holding a remote control" or "the girl on the chair").

In some implementations, the subject module, the location module, and the relationship module may each generate an attention weight using the equation below:

$$\hat{a}_{m,t} = \frac{\exp(\langle f_m, h_t \rangle)}{\sum_{k=1}^{T} \exp(\langle f_m, h_k \rangle)} \quad \text{(Equation 2)}$$

where $\hat{a}_{m,t}$ is an attention weight, such that $m \in \{\text{subject, location, relationship}\}$ and t refers to a word embedding of the natural language request 205, T is the length of the natural language request 205, $f_m$ is a trainable vector, and $h_t$ and $h_k$ are hidden vectors of $\{h_t\}_{t=1}^{T}$ hidden word vectors of the natural language request 205.

The attention weight is a value that represents an inference of a relevance between a word or a phrase of the natural language request 205 and the image editing operation selected by the attention layer 305. In some implementations, to condition the attention weights generated by the subject module 320, the location module 325, and the relationship module 330, the language attention network 310 generates the operation conditioned attention weight by multiplying the attention weights outputted by the subject module, the location module, and the relationship module by the operation attention weight 335 for the selected image editing operation. For example, the language attention network 315 generates the operation conditioned attention weight, $q_m^n$, for each of the subject module 320, the location module 325, and the relationship module 330, using, for example, the equations below:

$$\hat{a}_{m,t} = \frac{\alpha_t a_{m,t}}{\sum_{k=1}^{T} \alpha_k a_{m,k}} \quad \text{(Equation 3)}$$

$$q_m^n = \sum_{t=1}^{T} \hat{a}_{m,t}^n e_t \quad \text{(Equation 4)}$$

where $e_t$ is a given word vector of $\{e_t\}_{t=1}^{T}$ word vectors of the natural language request 205, and n refers to a given modular phrase embedding of n modular phrase embeddings of the natural language request 205.

In some implementations, the language attention network 315 may individually generate a matching score between each word embedding for which an attention weight is generated and the corresponding visual feature (e.g., the object of a man wearing a red shirt). For instance, the language attention network 315 combines (e.g., in a weighted average) the matching scores from the subject module 320, the location module 325, and the relationship module 330. The ranking loss for a positive query-region pair $(Q_i, R_i)$ and negative pair $(Q_j, R_j)$ may be expressed using the equation below:

$$L_{rank} = \Sigma_i (\max(0, \Delta + s(Q_i, R_j) - s(Q_i, R_i)) + \max(0, \Delta + s(Q_j, R_i) - s(Q_i, R_i))), \quad \text{(Equation 5)}$$

where s(x, y) denotes the matching score between a word embedding x and image region y, and Δ denotes the positive margin. The ranking loss for the positive query-region pair and the negative query-region pair represents a distance between two inputs. The ranking loss is used to train each visual module to locate an object or region of the source image based on the image editing operation. The highest matching score represents the object or region that is most relevant to the image editing operation. The language attention network 315 then generates a local image mask 340 when the image editing operation is classified as a local image editing operation. When the image editing operation is classified as a global image editing operation, the language attention network 315 can be bypassed, and the grounding model 120 generates a mask that covers the entirety of the source image.

The present disclosure is not limited to the use of three visual modules; namely the subject module 320, the location module 325, and the relationship module 330. Any number of modules may be implemented in the language attention network 315 for any aspect of the source image.

Figure 4:
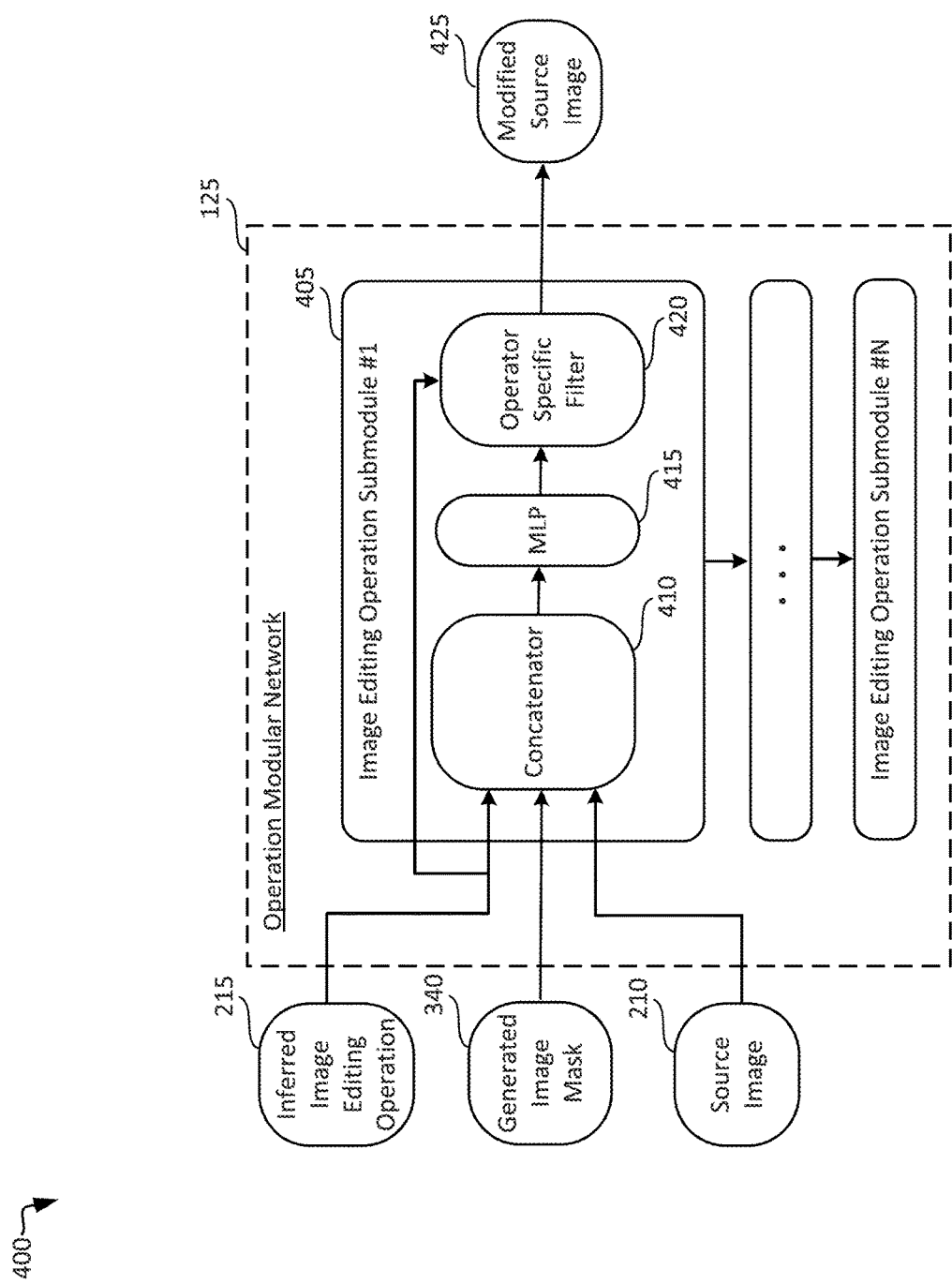
FIG. 4 depicts an example of using an operation modular network for performing an inferred image editing operation based on inferred parameters, according to some aspects of the present disclosure.

FIG. 4 depicts an example of a computing environment 400 for performing an inferred image editing operation based on inferred parameters using the operation modular network 125, according to some aspects of the present disclosure. The operation modular network 125 in this example is configured to generate an image that matches the modifications described in the natural language request 205. For example, the operation modular network 125 sequentially performs each image editing operation inferred from the natural language request 205 by the operation classifier model 115 (e.g., inferred image editing operation 215). As illustrated in FIG. 4, the operation modular network 125 is configured to include a submodule for each potential image editing operation.

The operation modular network 125 is trained to perform the image editing operation inferred by the operation classifier model 115 using the image mask generated by the grounding model 120. In some implementations, the operation modular network 125 includes a plurality of submodules, such that each submodule is specifically trained to perform an image editing operation. For example, a submodule is implemented using one or more differentiable filters, which are also resolution independent.

In some implementations, an image editing operation needs to be parameterized before the operation can be performed. Parameterizing an image editing operation includes defining one or more parameters used to perform the operation. The parameters for an image editing operation are inferred using the submodule associated with that image editing operation. To illustrate and only as a non-limiting example, the operation modular network 125 executes submodule 405, which is specifically configured to perform a brightness operation. The submodule 405 is configured to predict a brightness parameter, which represents a magnitude of brightness to apply to the source image when performing the brightness operation. The submodule 405 receives as input the inferred image editing operation 215, the generated image mask 340, and the source image 210. The source image 210 is transformed into a feature vector using a trained neural network. The concatenator 410 concatenates the feature vector and a vector representation of the inferred image editing operation 215. The output of the concatenator 410 is inputted into a trained neural network (e.g., a feed-forward artificial neural network, such as an MLP 415) to generate the brightness parameter using a regression. The operator specific filter 420 performs the brightness operation based on the regressed brightness parameter to generate the modified source image 425.

As yet non-limiting examples, the brightness and saturation image editing operations are executed by scaling the hue, saturation, value (HSV) channels using a differentiable filter. The sharpness image editing operation may be achieved by adding an image spatial gradient to the existing channels. The color_bg (e.g., background color) and inpaint_obj (e.g., remove object) image editing operations are non-differentiable, and thus, these two operations are not implemented using a differentiable filter. To implement the color_bg image editing operation, the masked area is converted to white given the sample distribution. To implement the inpaint_obj image editing operation on the source image, an inpainting model, such as Edge-Connect may be used. Except for the color_bg and inpaint_obj image editing operations, other operations require input parameters before the operations can be performed. The submodule corresponding to the operation is executed to infer the needed input parameters. For example, the inferred image editing operation and the feature vector of the source image 210 are concatenated and then processed by an MLP to generate the parameter using a regression. The differentiable filter receives the parameter and generated image mask 340 to generate the modified source image 425 as an output. In some implementations, the various submodules are linked together to create the operation modular network 125, with the color_bg and inpaint_obj at the beginning of the chain.

Figure 5:
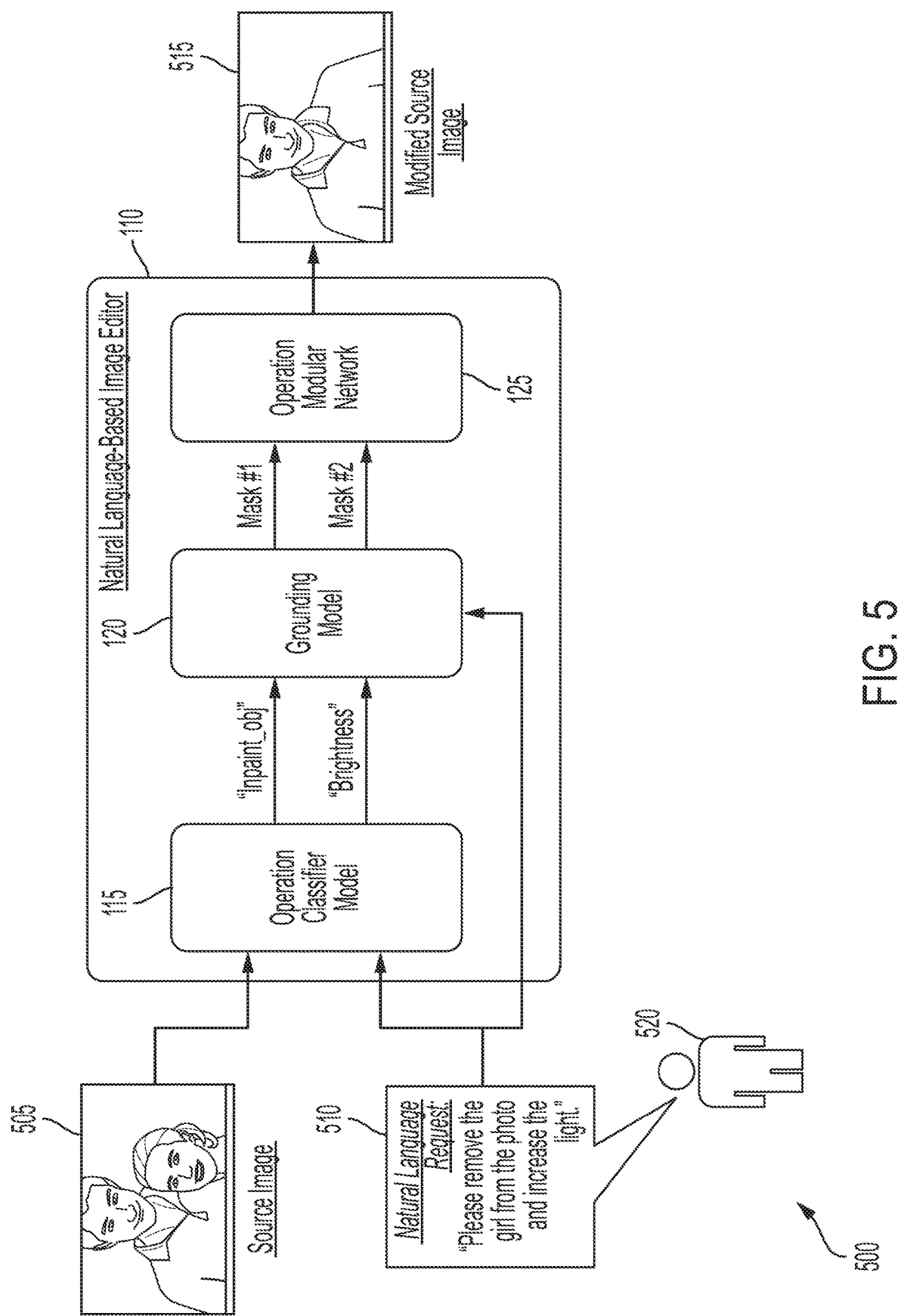
FIG. 5 depicts an example of a user executing a natural language-based image editor to edit a source image using a natural language request, according to some aspects of the present disclosure.

FIG. 5 depicts an example of a process 500, in which a user 520 executes a natural language-based image editor 110 to edit a source image using a natural language request, according to some aspects of the present disclosure. The user 520 operates the natural language-based image editor 110 to make use of functionality that enables the user 520 to select and perform image editing operations using natural language requests spoken by the user 520.

To illustrate and only as a non-limiting example, while the natural language-based image editor 110 is executing, the user 520 uploads the source image 505, and then speaks the following natural language request 510: "Please remove the girl from the photo and increase the light." The source image 505 and the natural language request 510 is received as inputs to the natural language-based image editor 110, which passes the source image 505 and the natural language request 510 to the operation classifier model 115. The operation classifier model 115 evaluates the source image 505 and the natural language request 510 using trained neural networks to infer that the natural language request 510 describes two separate image editing operations. The operation classifier model 115 segments the natural language request 510 into two phrases: "Please remove the girl from the photo" and "increase the light." Further, the operation classifier model 115 infers that the phrase "Please remove the girl from the photo" corresponds to the "inpaint_obj" image editing operation. The operation classifier model 115 also infers that the phrase "increase the light" corresponds to the "Brightness" image editing operation.

The operation classifier model 115 outputs "inpaint_obj" and "Brightness" as multiple inferred image editing operations. The grounding model 120 receives the inferred image editing operations of "inpaint_obj" and "Brightness" as inputs (along with other inputs, such as the natural language request 510 and the source image 505, not shown). The grounding model 120 classifies the "inpaint_obj" image editing operation as a local image editing operation, and then grounds the "inpaint_obj" image editing operation to the pixels of the source image 505 that depicts a girl. The grounding model 120 generates an image mask that hides the background pixels but reveals the pixels depicting the girl in the source image 505 (or vice versa). Likewise, the grounding model 120 classifies the "Brightness" image editing operation as a global image editing operation, and then grounds the "Brightness" image editing operation to the entire source image 505. In this case, the entire source image 505 is the image mask.

The grounding model 120 outputs two masks to the operation modular network 125. Mask #1 is a local image mask for the "inpaint_obj" image editing operation. Mask #2 is a global image mask for the "Brightness" image editing operation. Each mask is received at the operation modular network 125, which is trained to perform the two inferred image editing operations. The operation modular network 125 includes a submodule for the "inpaint_obj" image editing operation and another separate and distinct submodule for the "Brightness" image editing operation. The "Brightness" submodule infers a parameter (e.g., a brightness value indicating a magnitude of applying brightness to the source image 505) for the "Brightness" image editing operation because the natural language request 510 does not specify any parameters. Each of the "inpaint_obj" and the "Brightness" image editing operations are executed sequentially (or in parallel) to generate the modified source image 515.

Figure 6:
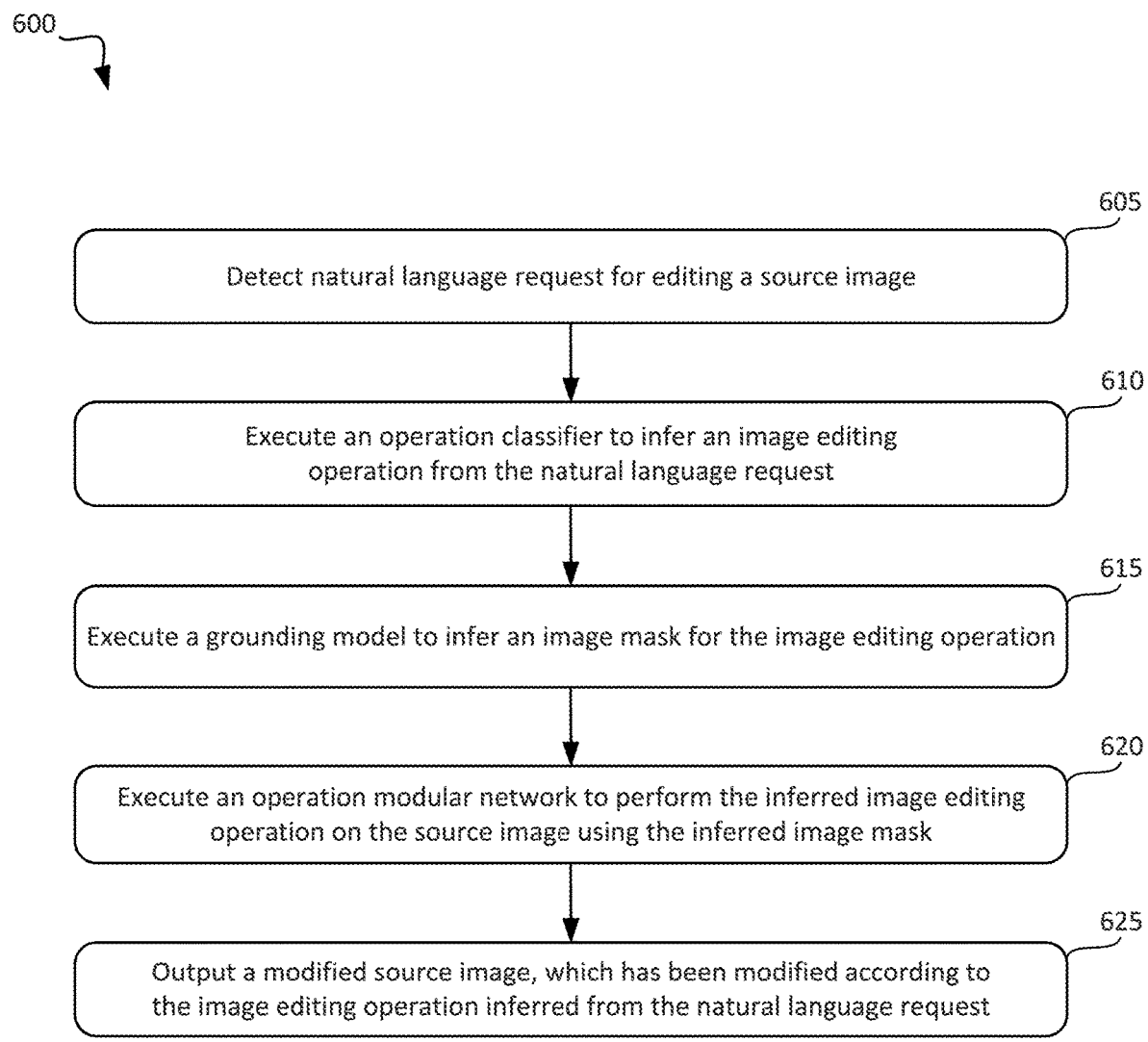
FIG. 6 depicts an example of a process for inferring image editing operations from natural language requests and performing the inferred image editing operations, according to some aspects of the present disclosure.

FIG. 6 depicts an example of a process 600 for inferring image editing operations from natural language requests and performing the inferred image editing operations on a source image, according to some aspects of the present disclosure. Process 600 is performed at least in part by any of the hardware-based computing devices illustrated in FIGS. 1-5 or FIGS. 8-9. For example, process 600 is performed by one or more servers included in the image editing system 100, the image editor 105, or the natural language-based image editor 110. As a further example, the natural language-based image editor 110 performs process 600 as part of an image editing function, such as image editing in response to natural language requests, to modify a source image according to a natural language request spoken by a user.

At block 605, the image editing system 100 or the natural language-based image editor 110 detects an audible signal representing a natural language request spoken by a user. For example, the natural language request is a natural language expression that indicates the editing tasks that the user desires to be performed on a source image. The natural language-based image editor 110 includes an operation classifier model 115, a grounding model 120, and an operation modular network 125, which operate in concert to infer the image editing operation from the natural language request, infer the parameters for the image editing operation, and then perform the inferred image editing operation.

At block 610, the source image and the natural language request are received at the operation classifier model. In some implementations, the operation classifier model encodes the source image using a neural network (e.g., a residual neural network), encodes the natural language request using another neural network (e.g., a bi-directional LSTM neural network), and then concatenates the encoded source image and the encoded natural language request. The concatenated output is then inputted into one or more fully connected layers of a trained neural network to generate a final inference of one or more image editing operations.

At block 615, the output of the operation classifier model (e.g., the inferred image editing operation) is fed as an input to the grounding model (along with other data signals, such as the source image, the natural language request, and so on). The grounding model individually processes each inferred image editing operation. For example, if two inferred image editing operations are received at the grounding model, then the grounding model selects a first inferred image editing operation. The grounding model classifies the first inferred image editing operation as a local image editing operation or a global image editing operation. When the first inferred image editing operation is a global image editing operation, then the grounding model generates an image mask that covers the entire source image. Further, when the first inferred image editing operation is a local image editing operation, then the grounding model grounds the first inferred image editing operation to an object or region of the source image that is inferred to be most relevant to the first inferred image editing operation (e.g., using a language attention network). The grounding model then generates an image mask for that object or region of the source image.

At block 620, the output of the grounding model is fed as an input into the operation modular network. The output of the grounding model includes the generated image mask, the source image, and/or the natural language request. The operation modular network is comprised of a chain of one or more submodules that are linked together. Each submodule is configured to perform an inferred image editing operation, for example, using a differentiable filter. Further, a submodule is configured to automatically infer one or more parameters for performing the image editing operation. For example, if the image editing operation is to increase the brightness of the source image, the submodule that is specifically configured to perform the brightness operation automatically infers the brightness value that should be applied to the source image. The user does not have to provide the brightness value, but rather, the submodule for the brightness operation infers the brightness value. The operation modular network performs each inferred image editing operation in a sequential manner (or in parallel) to generate a modified source image. At block 625, the natural language-based image editor outputs the modified source image to a user device (e.g., user system 135) operated by the user. The modified source image is modified according to the natural language request spoken by the user. The modified source image may or may not be further edited by the user using the natural language-based image editor.

FIG. 7 depicts an example of various stages of process 600 as described with respect to FIG. 6. In example 705, the input refers to the source image inputted by the user. The natural language request is "crop out everyone except the pastor and the guy in the black short sleeve shirt." The source image and the natural language request pass through the operation classifier model, which infers that the user's intended image editing operation is "inpaint_obj," which is an operation that removes an object from an image. The inferred image editing operation then is passed through the grounding model, which generates the "predicted" image mask shown in example 705 of FIG. 7. The "gt mask" refers to the ground truth image mask. The operation modular network receives the predicted image mask, the source image, and the natural language request to generate the output image (under "gt output") by executing the submodule specifically configured for performing the "inpaint_obj" image editing operation. The output image is modified according to the user's natural language request because the individuals other than the "guy in the black short sleeve shirt" have been removed.

Similarly, in example 710, the input refers to the source image inputted by the user. The natural language request is "Remove the two bridesmaids." The source image and the natural language request pass through the operation classifier model, which infers that the user's intended image editing operation is "inpaint_obj," which is an operation that removes an object from an image. The inferred image editing operation then is passed through the grounding model, which generates the "predicted" image mask shown in example 710 of FIG. 7. The operation modular network receives the predicted image mask, the source image, and the natural language request to generate the output image (under "gt output"). The output image is modified according to the user's natural language request because the two bridesmaids have been removed.

Examples of Computing Environments for Implementing Certain Embodiments

Any suitable computing system or group of computing systems can be used for performing the operations described herein. For example, FIG. 9 depicts an example of computing device 900 that may be at least a portion of image editing system 100. The implementation of the computing device 900 could be used for one or more of the image editor 105 or the user system 135. In an embodiment, a single image editing system 100 having devices similar to those depicted in FIG. 9 (e.g., a processor, a memory, etc.) combines the one or more operations and data stores depicted as separate subsystems in FIG. 1. Further, FIG. 8 illustrates a cloud computing system 800 by which at least a portion of the image editing system 100 may be offered.

In some embodiments, the functionality provided by the image editing system 100 may be offered as cloud services by a cloud service provider. For example, FIG. 8 depicts an example of a cloud computing system 800 offering an image editing service that can be used by a number of user subscribers using user devices 825a, 825b, and 25c across a data network 820. In the example, the image editing service may be offered under a Software as a Service (SaaS) model. One or more users may subscribe to the image editing service, and the cloud computing system performs the processing to provide the image editing service to subscribers. The cloud computing system may include one or more remote server computers 805.

The server computers 805 include any suitable non-transitory computer-readable medium for storing program code (e.g., an image editing system 100) and program data 810, or both, which is used by the cloud computing system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 805 can include volatile memory, non-volatile memory, or a combination thereof.

One or more of the servers 805 execute the program code 810 that configures one or more processors of the server computers 805 to perform one or more of the operations that provide image editing services, including the ability to utilize the natural language-based image editor 110 to perform shot-matching and other image editing techniques. As depicted in the embodiment in FIG. 8, the one or more servers providing the services to perform image editing via the natural language-based image editor 110 may include access to the models of the natural language-based image editor 110 including the operation classifier model 115, the grounding model 120, and the operation modular network 120. Any other suitable systems or subsystems that perform one or more operations described herein (e.g., one or more development systems for configuring an interactive user interface) can also be implemented by the cloud computing system 800.

In certain embodiments, the cloud computing system 800 may implement the services by executing program code and/or using program data 810, which may be resident in a memory device of the server computers 805 or any suitable computer-readable medium and may be executed by the processors of the server computers 805 or any other suitable processor.

In some embodiments, the program data 810 includes one or more datasets and models described herein. Examples of these datasets include image data, new image content, image energy data, etc. In some embodiments, one or more of data sets, models, and functions are stored in the same memory device. In additional or alternative embodiments, one or more of the programs, data sets, models, and functions described herein are stored in different memory devices accessible via the network interface 815.

The cloud computing system 800 also includes a network interface device 815 that enables communications to and from cloud computing system 800. In certain embodiments, the network interface device 815 includes any device or group of devices suitable for establishing a wired or wireless data connection to the data networks 820. Non-limiting examples of the network interface device 815 include an Ethernet network adapter, a modem, and/or the like. The image editing system 100 is able to communicate with the user devices 825a, 825b, and 825c via the data network 820 using the network interface 815.

FIG. 9 illustrates a block diagram of an example computer system 900. Computer system 900 can be any of the described computers herein including, for example, image editor 105, user system 135, or server computer 805. The computing device 900 can be or include, for example, a laptop computer, desktop computer, tablet, server, or other electronic device.

The computing device 900 can include a processor 935 interfaced with other hardware via a bus 905. A memory 910, which can include any suitable tangible (and non-transitory) computer readable medium, such as RAM, ROM, EEPROM, or the like, can embody program components (e.g., program code 915) that configure operation of the computing device 800. Memory 910 can store the program code 915, program data 917, or both. In some examples, the computing device 900 can include input/output ("I/O") interface components 925 (e.g., for interfacing with a display 940, keyboard, mouse, and the like) and additional storage 930.

The computing device 900 executes program code 915 that configures the processor 935 to perform one or more of the operations described herein. Examples of the program code 915 include, in various embodiments, the natural language-based image editor 110 including the operation classifier model 115, the grounding model 120, and the operation modular network 120, the image editing function, or any other suitable systems or subsystems that perform one or more operations described herein (e.g., one or more development systems for configuring an interactive user interface). The program code 915 may be resident in the memory 910 or any suitable computer-readable medium and may be executed by the processor 940 or any other suitable processor.

The computing device 900 may generate or receive program data 917 by virtue of executing the program code 915. For example, the source image and modified source image 210 are all examples of program data 917 that may be used by the computing device 900 during execution of the program code 915.

The computing device 900 can include network components 920. Network components 920 can represent one or more of any components that facilitate a network connection. In some examples, the network components 920 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 920 can be wired and can include interfaces such as Ethernet, USB, or IEEE 1394.

Although FIG. 9 depicts a single computing device 900 with a single processor 935, the system can include any number of computing devices 900 and any number of processors 935. For example, multiple computing devices 900 or multiple processors 935 can be distributed over a wired or wireless network (e.g., a Wide Area Network, Local Area Network, or the Internet). The multiple computing devices 900 or multiple processors 935 can perform any of the steps of the present disclosure individually or in coordination with one another.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A system comprising:
one or more processors; and
a non-transitory computer-readable medium communicatively coupled to the one or more processors and storing program code executable by the one or more processors, the program code implementing a natural language-based image editor comprising:
an operation classifier model configured to infer an image editing operation from a natural language request associated with a source image;
a grounding model configured to (a) locate an object or region of the source image that is inferred to correspond to the image editing operation and (b) generate an image mask for the object or region; and
an operation modular network configured to generate a modified source image by using a submodule to perform the image editing operation, the submodule configured to infer one or more parameters used for performing the image editing operation.

2. The system of claim 1, wherein the operation classifier model comprises:
a first neural network configured to encode the source image;
a second neural network configured to encode the natural language request; and
an operation classifier configured to infer the image editing operation in response to receiving the encoded source image and the encoded natural language request as an input.

3. The system of claim 1, wherein the grounding model further comprises:
an attention layer configured to classify the image editing operation as a local operator or a global operator, wherein the local operator applies to a local area of the source image, and wherein the global operator applies to an entirety of the source image; and
a language attention network configured to ground the image editing operation to the object or region within the source image when the image editing operation is classified as a local operator.

4. The system of claim 3, wherein the language attention network further comprises:
a subject module configured to generate a subject attention weight indicating a relevance between the object or region of the source image and a subject depicted in the source image;
a location module configured to generate a location attention weight indicating a relevance between the object or region of the source image and a location of the subject depicted in the source image;
a relationship module configured to generate a relationship attention weight indicating a relevance between the object or region of the source image and another object depicted within the source image; and
an operation attention module configured to locate the object or region within the source image by modifying the subject attention weight, the location attention weight, and the relationship attention weight using an operation attention weight.

5. The system of claim 1, wherein the submodule for the image editing operation includes a differentiable filter.

6. The system of claim 5, wherein the differentiable filter modifies the source image based on the source image, the natural language request, and the generated image mask, and wherein the modified source image is modified according to the image editing operation.

7. The system of claim 1, wherein the natural language request is generated based on audio data representing a natural language expression spoken by a user.

8. A computer-implemented method comprising:
retrieving a source image and a natural language request;
inferring, using an operation classifier model, an image editing operation from the natural language request;
generating, using a grounding model, an image mask for an object or region of the source image that is inferred to correspond to the image editing operation;
performing, using a submodule of an operation modular network, the image editing operation on the source image, wherein the submodule is configured to infer one or more parameters used for performing the image editing operation; and
outputting a modified source image.

9. The computer-implemented method of claim 8, wherein inferring the image editing operation from the natural language request further comprises:
encoding the source image using a first neural network;
encoding the natural language request using a second neural network; and inferring, using an operation classifier, the image editing operation from the natural language request in response to receiving the encoded source image and the encoded natural language request as an input.

10. The computer-implemented method of claim 8, wherein generating the image mask further comprises:
classifying, using an operation region model, the image editing operation as a local operator or a global operator, wherein the local operator applies to a local area of the source image, and wherein the global operator applies to an entirety of the source image; and
grounding, using a language attention network, the image editing operation to the object or region within the source image when the image editing operation is classified as a local operator.

11. The computer-implemented method of claim 10, further comprising:
generating a subject attention weight indicating a relevance between the object or region of the source image and a subject depicted in the source image;
generating a location attention weight indicating a relevance between the object or region of the source image and a location of the subject depicted in the source image;
generating a relationship attention weight indicating a relevance between the object or region of the source image and another object depicted within the source image; and
locating the object or region within the source image by modifying the subject attention weight, the location attention weight, and the relationship attention weight using an operation attention weight.

12. The computer-implemented method of claim 8, further comprising generating the modified source image, wherein the modified source image is modified according to the image editing operation.

13. The computer-implemented method of claim 12, further comprising:
generating the modified source image in response to receiving the source image, the natural language request, and the generated image mask.

14. The computer-implemented method of claim 8, wherein the natural language request is generated based on audio data representing a natural language expression spoken by a user.

15. A computer-program product tangibly embodied in a non-transitory machine-readable storage medium, including instructions configured to cause a processing apparatus to perform operations including:
retrieving a source image and a natural language request;
inferring an image editing operation from the natural language request in response to receiving an encoded source image and an encoded natural language request as an input;
classifying an image editing operation as a local operator or a global operator, wherein the local operator applies to a local area of the source image, and wherein the global operator applies to an entirety of the source image;
grounding the image editing operation to an object or region within the source image to generate an image mask when the image editing operation is classified as a local operator;
editing the source image based on the image editing operation as inferred from the natural language request to produce a modified source image; and
generating the modified source image in response to receiving the source image, the natural language request, and the generated image mask, and wherein the modified source image is modified according to the image editing operation.

16. The non-transitory machine-readable storage medium of claim 15, wherein editing the source image further comprises:
encoding the source image using a first neural network; and
encoding the natural language request using a second neural network.

17. The non-transitory machine-readable storage medium of claim 15, wherein editing the source image further comprises:
generating a subject attention weight indicating a relevance between the object or region of the source image and a subject depicted in the source image; and
generating a location attention weight indicating a relevance between the object or region of the source image and a location of the subject depicted in the source image.

18. The non-transitory machine-readable storage medium of claim 17, wherein editing the source image further comprises:
generating a relationship attention weight indicating a relevance between the object or region of the source image and another object depicted within the source image; and
locating the object or region within the source image by modifying the subject attention weight, the location attention weight, and the relationship attention weight using an operation attention weight.

19. The non-transitory machine-readable storage medium of claim 15, wherein the operations further comprise performing the image editing operation by inferring one or more parameters used for performing the image editing operation.

\* \* \* \* \*